United States Patent [19]

Kassai

[11] Patent Number: 4,759,566
[45] Date of Patent: Jul. 26, 1988

[54] INCLINED STATE INDICATING DEVICE FOR SEAT OF BABY CARRIAGE

[75] Inventor: Kenzou Kassai, Osaka, Japan

[73] Assignee: Aprica Kassai Kabushikikaisha, Osaka, Japan

[21] Appl. No.: 903,220

[22] Filed: Sep. 2, 1986

[30] Foreign Application Priority Data

Sep. 3, 1985 [JP] Japan .................................. 60-194390

[51] Int. Cl.[4] .............................................. B62B 9/12
[52] U.S. Cl. ...................................... 280/642; 280/650; 280/47.4; 297/316; 116/28 R
[58] Field of Search ............... 280/642, 643, 644, 650, 280/47.38, 47.4; 297/313, 319, 322, 316; 116/311, 303, 313, 28 R

[56] References Cited

U.S. PATENT DOCUMENTS

| 105,505 | 7/1870 | Stagg | 280/642 |
| 776,665 | 12/1904 | Leadbetter | 280/642 |
| 1,133,985 | 3/1915 | McComish | 116/303 |
| 2,783,053 | 2/1957 | Sheldrick et al. | 280/47.4 |
| 3,248,125 | 4/1966 | Gill | 280/642 |

FOREIGN PATENT DOCUMENTS

| 1164434 | 10/1958 | France | 297/319 |
| 44070 | 3/1986 | Japan . | |

Primary Examiner—David M. Mitchell
Assistant Examiner—Brian L. Johnson
Attorney, Agent, or Firm—W. G. Fasse; D. H. Kane, Jr.

[57] ABSTRACT

An inclined seat indicating device for a baby carriage is part of a seat support member of the baby carriage. The angle of inclination of the seat support member is adjustable relative to a fixed member which is fixed in a position so that the seat support member overlaps the fixed member. Either the seat support member or the fixed member is provided with a mark device for distinguishing the inclined state of the seat support relative to the fixed member. The respective other member is provided with a window through which the relative position may be observed.

4 Claims, 5 Drawing Sheets

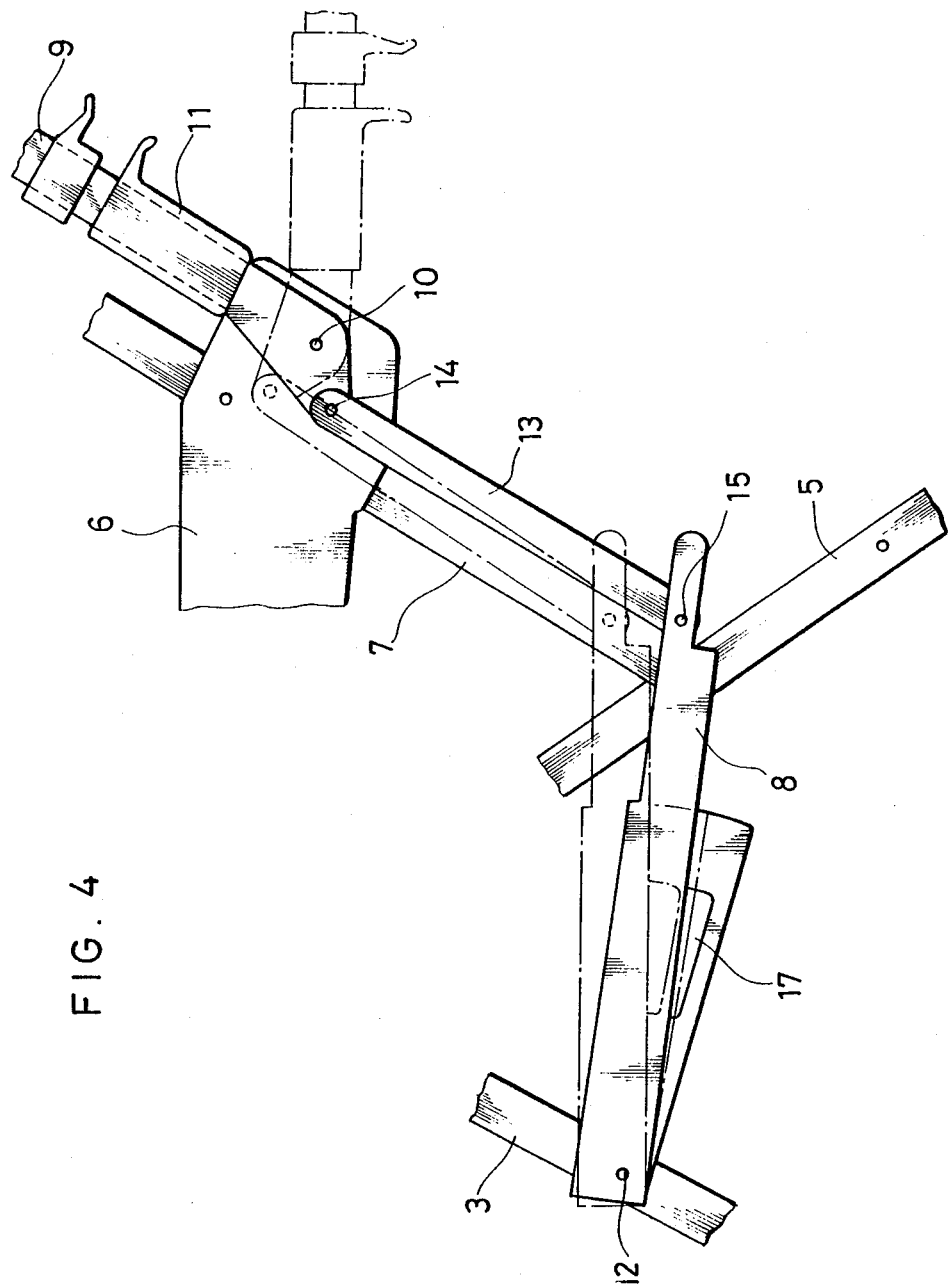

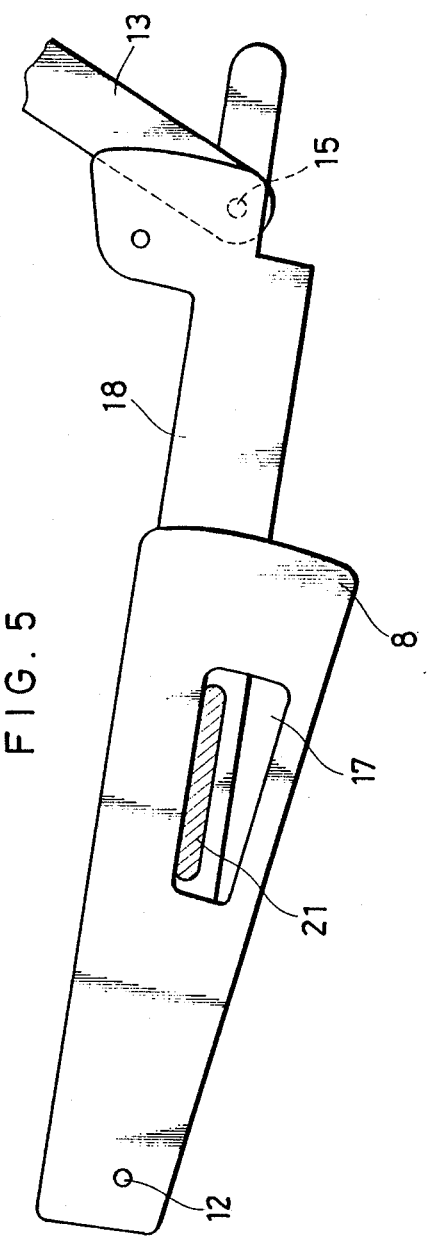
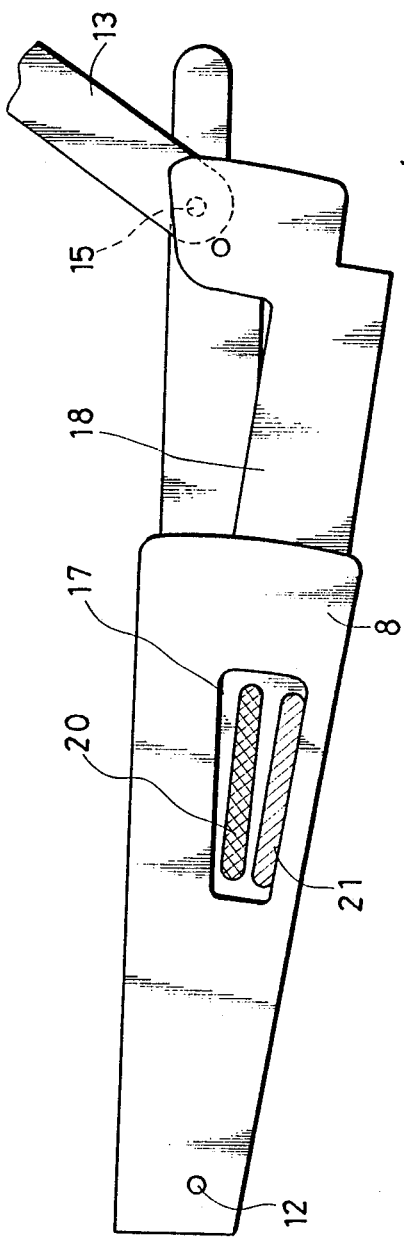

INCLINED STATE INDICATING DEVICE FOR SEAT OF BABY CARRIAGE

BACKGROUND OF THE INVENTION

1. Field of the Invention

This invention relates to a baby carriage wherein the angle of inclination of a seat support member is adjustable, and more particularly it relates to an inclined seat indicating device for the seat support member.

2. Description of the Prior Art

Prior art of interest to this invention is described in Japanese Patent Application No. 164560/1984 (Japanese Patent Laying-Open No. 44070/1986) filed on Aug. 6, 1984, by the same applicant as in this application. The baby carriage disclosed in said Japanese Patent Application No. 164560/1984 has a seat whose angle of inclination is adjustable. With this arrangement, the posture of a baby placed in the baby carriage can be maintained at an optimum.

· Even such a superior baby carriage still has something to be improved. That is, if a change in the angle of inclination of the seat is small it may be difficult to clearly ascertain whether or not the angle of inclination of the seat has been changed at all even if the baby carriage is inspected. For mothers and fathers who are concerned regarding the health of their babies, it is desirable that a change in the angle of inclination of the seat can be clearly ascertained.

SUMMARY OF THE INVENTION

Accordingly, it is an object of the invention to provide an inclined state indicating device for the seat of a baby carriage, which makes it possible to clearly see a change in the inclined state of the seat.

An inclined state indicating device for the seat of a baby carriage according to the invention comprises a seat support member which supports the seat of a baby carriage and whose angle of inclination is adjustable, and a fixed member which is fixed at a position where the seat support member overlaps it. Either the seat support member or the fixed member is provided with mark means for distinguishing the inclined state of the seat support member. The other member is provided with a window for making it possible to observe said mark means from the outside.

Therefore, mothers and fathers can observe the mark means through said window. Since the state of indication of the mark means changes with a change in the angle of inclination of the seat support member, mothers and fathers can clearly ascertain a change in the angle of inclination of the seat and can thus know that the proper inclination of the seat is used.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a side view showing a construction associated with the seat support member;

FIG. 5 is a side view showing the overlap region between the seat support member and a fixed member provided on the left-hand side of the baby carriage whereby the seat support member is in a downward position; and FIG. 6 is a view showing the state established when the rear end portion of the seat support member has been moved into an upward position from the downward position shown in FIG. 5.

DESCRIPTION OF THE PREFERRED EMBODIMENTS

Figure 1:
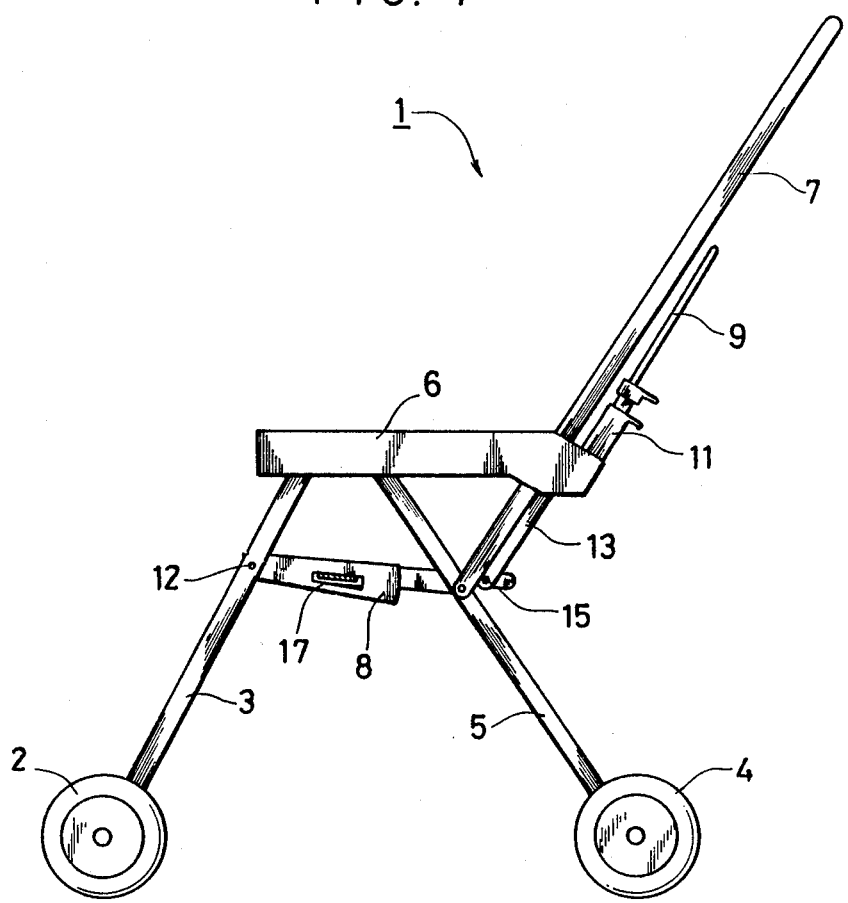
FIG. 1 is a side view of a baby carriage to which an embodiment of the invention is applied.

The illustrated baby carriage 1 comprises front legs 3 each having a front wheel 2, rear legs 5 each having a rear wheel 4, handrails 6, push rods 7 extending through the rear end portions of the handrails 6 and having their lower ends attached to the rear legs 5, and a backrest support member 9 turnably attached to the rear end portions of the handrails 6. The inclined state indicating device for seats according to the invention is provided in connection with a position adjustable seat support member 8.

Figure 2:
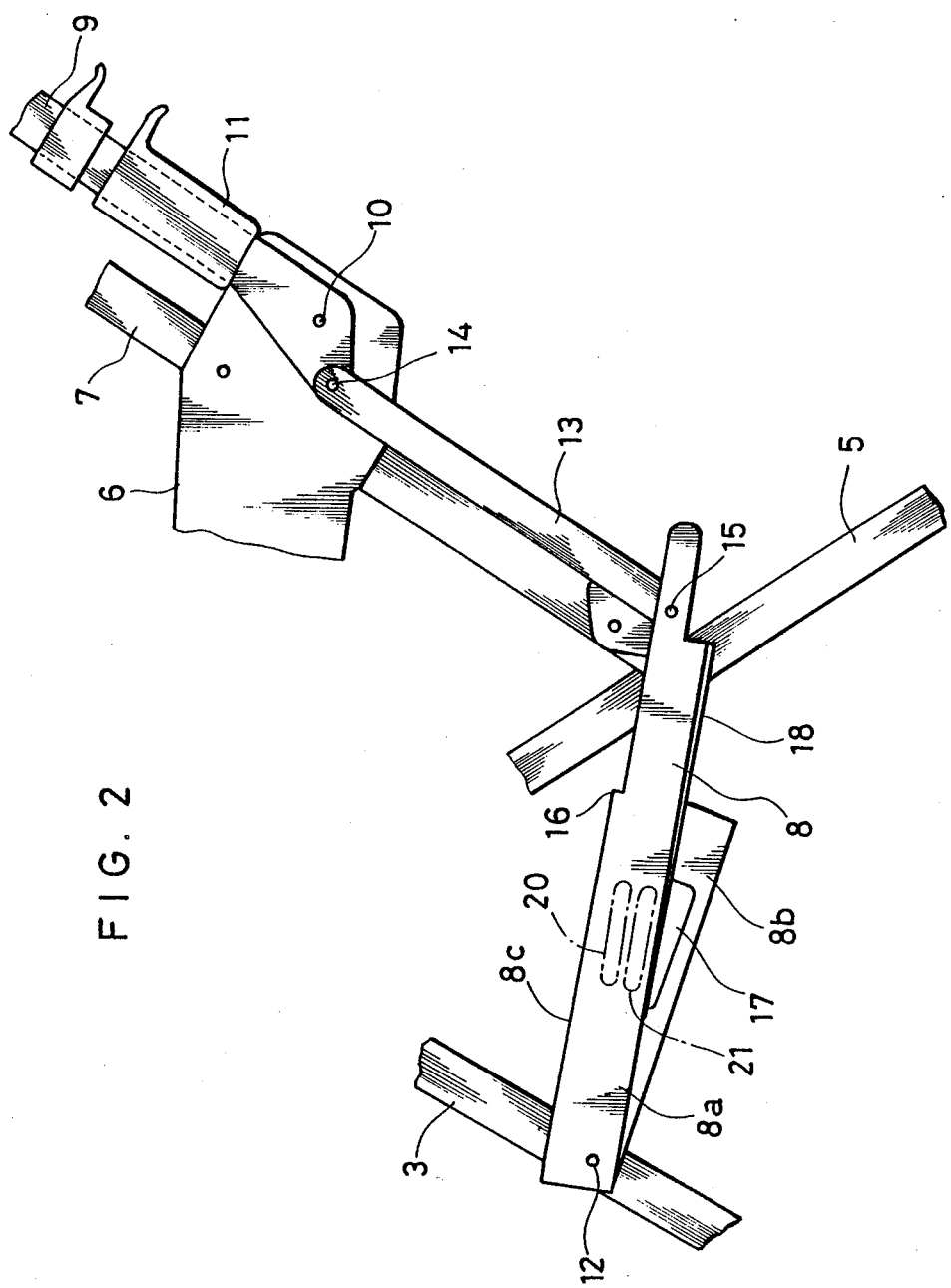
FIG. 2 is a side view showing the principal portion of the invention.

FIG. 2 is a side view showing the principal portion of the invention. While FIG. 1 shows a left-hand side view of the baby carriage 1, FIG. 2 shows the portion of the baby carriage 1 associated with its right-hand side as viewed from the inside of the carriage. That is, the front leg 3, the rear leg 5 and the handrail 6 shown in FIG. 2 are provided on the right-hand side of the baby carriage 1.

Referring to FIG. 2, the backrest support member 9 supporting the backrest is turnably attached to the rear end portion of the handrail 6 by a pin 10. Thus, the backrest support member 9 can be turned backwardly i.e., clockwise around the axis of the pin 10 from the illustrated state. The backrest support member 9 is fixed in a suitable inclined state by inclining adjusting means 11.

The position adjustable seat support member 8 for supporting the seat is of elongated shape and is turnably connected at its front end portion as viewed in a forward moving direction of the baby carriage, to the front leg 3 by a pin 12. Further, the rear end portion of the seat support member 8, as shown, is turnably connected by a pin 15 to the lower end portion of a link rod 13 which is turnably connected by a pin 14 to the lower end portion of the backrest support member 9. Therefore, when the backrest support member 9 is inclined backwardly from the state shown in FIG. 2, the rear end portion of the position adjustable seat support member 8 is raised by the link rod 13. As a result, the angle of inclination of the seat support member 8 is changed. When it is desired to use the seat of the baby carriage 1 as a chair, the seat support member 8 will be adjusted so that it is somewhat lowered at its rear end. As the backrest support member 9 is inclined backwardly, the seat support member 8 is brought to a substantially horizontal state.

In FIG. 2, the seat support member 8 has a step 16. The portion of the seat support member 8 disposed forwardly of the step 16 has a substantially inverted U-shape cross-section. Thus, the portion of the seat support member 8 disposed forwardly of the step 16 comprises an inner wall 8a positioned on the inner side, an outer wall 8b positioned on the outer side, and a top wall 8c which connects the upper edges of said inner and outer walls 8a and 8b. The outer wall 8b of the seat support member 8 has a window 17 in the form of a through-hole. Further, a fixed reference member 18 is positioned so that it overlaps the seat support member 8; that is, it is received in the U-shaped portion of the seat support member. In FIG. 2, only part of the fixed reference member 18 is exposed to view.

Figure 3:
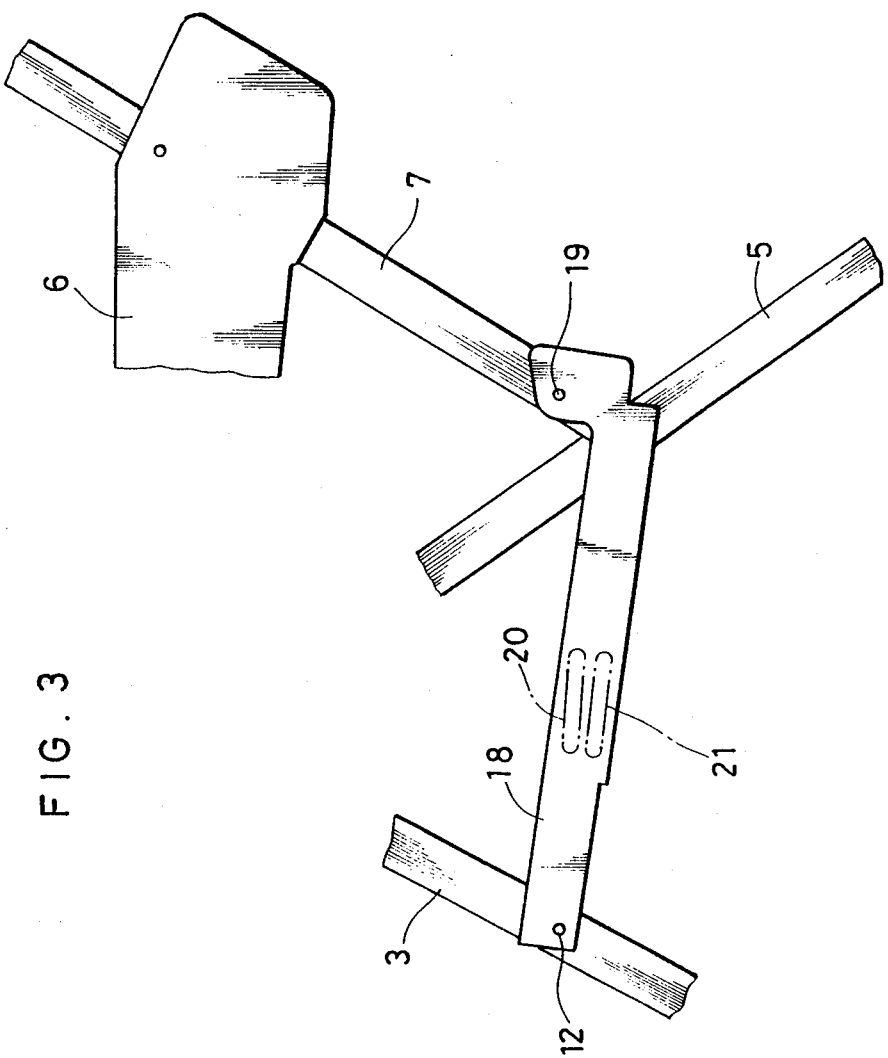
FIG. 3 is a simplified view of the construction of FIG. 2 with a seat support member, a link rod and a backrest support member removed from FIG. 2.

In FIG. 3, to clearly show the fixed reference member 18, it is to be noted that the seat support member 8, the link rod 13 and the backrest support member 9 have been removed. As shown, the fixed reference member 18 is connected at its front end to the front leg 3 by the pin 12 and at its rear end to the push rod 7 by a pin 19. As a result the fixed reference member 18, unlike the aforesaid position adjustable seat support member 8, has a fixed angle of inclination. The fixed reference member 18 has two marks 20 and 21, one above the other, applied to the outer surface thereof facing away from the viewer. The mark 20 is, e.g., a blue indication mark, while the mark 21 is a red indication mark. The position of these two marks 20 and 21 is such that they can be observed through the window 17 formed in said seat support member 8. The marks and window form indicator means.

FIG. 4 is a view for clarifying a change in the angle of inclination of the seat support member 8. As shown, when the backrest support member 9 is maintained in its raised position, the seat support member 8 is in its inclined state with its rear end portion lowered. As shown in phantom lines, when the backrest support member 9 is inclined almost to a horizontal state, the seat support member 8 is also brought to a horizontal state. In this manner, the seat support member 8 changes its angle of inclination in operative association with the inclining action of the backrest support member 9. With such movement of the seat support member 8, the window 17 is also moved upward or downward with the support member.

The construction shown in FIGS. 2 to 4 has been provided on the right-hand side of the baby carriage 1, it being noted that in a preferred embodiment, the same construction will also be provided on the left-hand side of the baby carriage 1. FIG. 5 is a side view showing the overlap portion between the seat support member 8 and fixed member 18 which are provided on the left-hand side of the baby carriage. The state shown in FIG. 5 is one in which the backrest support member 9 has been raised, i.e., the state in which the seat support member 8 has been inclined rearwardly downward. In this state, as shown, the red indication mark 21 alone can be observed through the window 17. On the other hand, the state shown in FIG. 6 is one in which the backrest support member 9 has been inclined almost into horizontal position, i.e., the state in which the seat support member 8 is substantially horizontal. In this state, not only the red indication mark 21 but also the blue indication mark 20 can be observed through the window 17. Therefore, mothers and fathers can distinguish the inclined state of the seat support member 8 by the state of the mark means observed through the window 17. That is, they can distinguish between two situations, one in which only the red indication mark 21 can be observer through the window 17, indicating the state in which the seat support member 8 has been inclined in a rearwardly backward direction, and the other in which the blue indication mark 20 can be observed in addition to the red mark indicating the state in which the seat support member 8 is substantially horizontal.

The embodiment described above is an example only which embodies the invention. Therefore, various modifications are possible. Some such modifications will now be described below.

The above embodiment is so arranged that the seat support member 8 is moved in operative association with the inclining action of the backrest support member 9; however, such operative association is not always necessary. That is, this invention is also applicable to a baby carriage in which the seat support member is independently movable. Further, in the above embodiment, the front end portion of the seat support member 8 has been turnably connected to the front leg 3 by the pin 12, while the rear end portion thereof is allowed to move up and down; however, the reverse arrangement may be made. That is, the invention is also applicable to a baby carriage in which the rear end portion of the seat support member 8 is turnably connected to the push rod 7 by a pin, while the front end thereof is allowed to move up and down.

As for the mark means for distinguishing the inclined state of the seat support member 8, various modifications are possible. For example, while the mark means described above has been in the form of two marks, the blue indication mark 20 and red indication mark 21, it is possible to use one mark only. In that case, the mark can be ascertained through the window 17, e.g., only when the seat support member 8 is horizontal. Alternatively, the colored mark may be replaced by a vertical line of graduations some of which are marked with numerals indicating angles. Further, such marks may be words such as "rearwardly inclined state" or "horizontal."

In the above embodiment, the seat support member 8 is provided with the window 17 and the fixed member 8 is provided with the mark means. However, reversely, the seat support member may be provided with mark means and the fixed member may be provided with a window. In that case, the seat support member and the fixed member will have their shapes suitably changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage, comprising frame means including front legs and rear legs as viewed in a forward moving direction of said baby carriage, a seat for seating a baby, seat mounting means for securing said seat to said frame means in several different seat positions, an indicating device for indicating an adjusted position of the seat, said seat mounting means comprising a position adjustable seat support member (8) which supports said seat of said baby carriage, means operatively connected to said seat support member for adjusting an angle of inclination of said seat support member, said indicating device including a fixed reference member (18), means (12, 19) for securing said fixed reference member (18) in a fixed position to said frame means of said baby carriage so that said position adjustable seat support member overlaps said fixed reference member (18), said securing means comprising a journal pin (12) for connecting a forward end, as viewed in said forward moving direction, of said fixed reference member (18) and a forward end, as viewed in said forward moving direction, of said position adjustable seat support member (8) to the same point on one of said front legs of said baby carriage so that said position adjustable seat support member (8) is tiltable relative to said fixed reference member (18) within a certain angular range, said baby carriage further comprising a backrest support member, link means connecting a rear end, as viewed relative to said forward moving direction, of said position adjustable seat support member to said backrest support member so that an angle of seat inclination of said position adjustable seat support member is adjusted together with an adjustment of said backrest support member, said indicating device comprising indicator means arranged on said position adjustable seat support member (8) and on said fixed reference member (18) for visibly indicating a particular degree of inclination of said position adjustable seat support member relative to said fixed reference member within said certain angular range.

2. The baby carriage of claim 1, wherein said position adjustable seat support member has a wall facing said fixed reference member, said indicator means comprising a window provided on said facing wall of said position adjustable seat support member for showing an inclination of said position adjustable seat support member relative to said fixed reference member.

3. The baby carriage of claim 1, wherein said indicator means comprise a plurality of color marks of different colors disposed one above another.

4. The baby carriage of claim 1, wherein said indicator means comprise at least one marker on one of said fixed reference member and said position adjustable seat support member, and a window in the other of said fixed reference member and said position adjustable seat support member so that said marker is visible through said window.

* * * * *